United States Patent
Kwon et al.

(10) Patent No.: US 8,009,758 B2
(45) Date of Patent: Aug. 30, 2011

(54) APPARATUS AND METHOD FOR CHANNEL-INTERLEAVING AND CHANNEL-DEINTERLEAVING DATA IN A WIRELESS COMMUNICATION SYSTEM

(75) Inventors: Hwan-Joon Kwon, Suwon-si (KR); Jae-Chon Yu, Suwon-si (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 349 days.

(21) Appl. No.: 12/143,017

(22) Filed: Jun. 20, 2008

(65) Prior Publication Data

US 2008/0317146 A1 Dec. 25, 2008

(30) Foreign Application Priority Data

Jun. 20, 2007 (KR) .................. 10-2007-0060790
Jun. 27, 2007 (KR) .................. 10-2007-0063985

(51) Int. Cl.
*H04L 27/00* (2006.01)
(52) U.S. Cl. .................... 375/295; 375/260
(58) Field of Classification Search ............... 375/260, 375/295; 370/208–210
See application file for complete search history.

(56) References Cited

U.S. PATENT DOCUMENTS

| | | | |
|---|---|---|---|
| 5,850,419 A | 12/1998 | Todoroki | |
| 7,668,248 B2* | 2/2010 | Hocevar | 375/260 |
| 2005/0053168 A1* | 3/2005 | Song et al. | 375/261 |
| 2006/0039275 A1* | 2/2006 | Walton et al. | 370/208 |
| 2008/0225965 A1* | 9/2008 | Pi et al. | 375/260 |
| 2008/0307427 A1* | 12/2008 | Pi et al. | 718/104 |
| 2010/0077265 A1* | 3/2010 | Wei et al. | 714/701 |

FOREIGN PATENT DOCUMENTS

| | | |
|---|---|---|
| JP | 9-261209 | 10/1997 |
| JP | 2002-510902 | 4/2002 |
| JP | 2007-096658 | 4/2007 |
| WO | WO 99/50990 | 10/1999 |

* cited by examiner

*Primary Examiner* — Emmanuel Bayard
(74) *Attorney, Agent, or Firm* — The Farrell Law Firm, P.C.

(57) ABSTRACT

An interleaving and deinterleaving apparatus and method in a wireless communication system are provided, in which it is determined whether coded bits to be transmitted in one modulation symbol are selected from a plurality of code blocks. The coded bits are interleaved on a modulation symbol basis if the coded bits to be transmitted in the modulation symbol are selected from a plurality of code blocks.

24 Claims, 18 Drawing Sheets

APPARATUS AND METHOD FOR CHANNEL-INTERLEAVING AND CHANNEL-DEINTERLEAVING DATA IN A WIRELESS COMMUNICATION SYSTEM

PRIORITY

This application claims priority under 35 U.S.C. §119(a) to Korean Patent Applications filed in the Korean Intellectual Property Office on Jun. 20, 2007 and assigned Serial No. 2007-60790 and on Jun. 27, 2007 and assigned Serial No. 2007-63985, the contents of each of which are incorporated herein by reference.

BACKGROUND OF THE INVENTION

1. Field of the Invention

The present invention relates generally to an apparatus and method for interleaving and deinterleaving data in a communication system, and more particularly, to an apparatus and method for interleaving and deinterleaving data in a wireless communication system.

2. Description of the Related Art

Communication systems are generally classified into wired and wireless communication systems. Wireless communication systems are constantly evolving, aiming to enable users to communicate while in motion. Beyond the early stage of voice communications only, wireless communication systems now provide a variety of communication services including data communications. Voice communications is a real-time service, while in contrast, data communications is a non-real-time service. Even though transmitted data is lost in the real-time service, data retransmission is generally insignificant. In comparison, the non-real-time service requires data retransmission for more accurate data transmission. For the data retransmission in the non-real-time service, Hybrid Automatic Repeat reQuest (HARQ) is used.

Orthogonal Frequency Division Multiplexing (OFDM) has recently been studied to provide high-speed data transmission on wired/wireless channels in mobile communication systems. OFDM is a special type of Multi-Carrier Modulation (MCM) in which a serial bit stream is converted to parallel bits and modulated to mutually orthogonal subcarrier channels. An OFDM-based technology for identifying a plurality of users by a plurality of subcarriers, that is, allocating different subcarriers to different users is called Orthogonal Frequency Division Multiple Access (OFDMA).

HARQ is a significant technology that increases the reliability of data transmission and throughput in a packet mobile communication system. It is a combination of Automatic Repeat reQuest (ARQ) and Forward Error Correction (FEC). ARQ is widely used for wireless/wired data communication systems. In ARQ, a transmitter transmits data packets labeled with sequence numbers in a method and a receiver requests retransmission of a packet with a lost sequence number to the transmitter. In this manner, data transmission is rendered reliable.

FEC is a technology for transmitting data added with redundant bits, \by using convolutional coding or turbo coding so as to overcome errors generated under a noise or fading environment and thus demodulate initially transmitted data. In a mobile communication system using HARQ, a receiver determines whether data decoded by performing an FEC operation in the reverse order has errors by a Cyclic Redundancy Code (CRC) check. In the absence of errors in the decoded data, the receiver feeds back an ACKnowledgment (ACK) to a transmitter so that the transmitter can transmit the next data packet. In the presence of errors in the decoded data, the receiver feeds back a Negative-ACKnowledgment (NACK) to the transmitter so that the transmitter can retransmit the erroneous packet. The receiver then combines a retransmitted packet with an initially transmitted packet. The resulting energy gain leads to an improved performance, compared to a conventional ARQ without combining.

FIG. 1A illustrates the transmission timings of data and signals in the conventional HARQ technique.

Referring to FIG. 1A, the horizontal axis represents time, and a data packet is transmitted on a data channel, which initially takes place in step 101. A receiver then receives the initially transmitted data packet and demodulates it in step 102. During the demodulation, the receiver determines whether the received data packet has errors. If it is determined that the demodulation is not successful, the receiver feeds back a Non-ACKnowledgement (NACK) message to the transmitter. The error determination can be made by a CRC check.

Upon receipt of the NACK, the transmitter retransmits the data packet at a first time in step 103. Even though the transmitter retransmits the same data as the initially transmitted data, it may transmit a different redundancy, i.e. different coded bits during the first retransmission in step 103. The same data packets transmitted in steps 101, 103 and 105 will be referred to as "subpackets". After receiving the first retransmitted data packet on the data channel, the receiver combines the initially transmitted data packet with the first retransmitted data by a rule and demodulates the combined data.

If the receiver determines that the demodulation has failed during the demodulation, it feeds back a NACK to the transmitter in step 104. The transmitter carries out a second retransmission a time after the first retransmission in step 105. The same packet data is encoded and transmitted during the initial transmission of step 101, the first retransmission of step 103 and the second retransmission of step 105.

After receiving the second retransmitted data, the receiver combines the initially transmitted data packet, the first retransmitted packet and the second retransmitted packet by the rule and demodulates the combined packet data. During the demodulation, the receiver determines whether the demodulation of the packet data is successful by a CRC check. If the demodulation is successful, the receiver feeds back an ACK to the transmitter in step 106. In step 107, the transmitter transmits an initial transmission subpacket of the next data packet to the receiver.

FIG. 1B is a block diagram of a transmitter and a receiver in a conventional OFDMA mobile communication system using HARQ.

Referring to FIG. 1B, in a transmitter 110, an encoder 111 encodes a data packet. A subpacket generator 112 selects all or part of the coded bits received from the encoder 111 and generates subpacket k with the selected coded bits, for a $k^{th}$ transmission. Here, k is 0 to m being a maximum retransmission number.

A transceiver chain 120 transmits subpacket k to a receiver 130 in a transmission/reception scheme such as OFDM.

In the receiver 130, a decoder 121 decodes subpacket k and feeds back an ACK or a NACK to the subpacket generator 112 of the transmitter 110 according to the decoding result.

The subpacket generator 112 of the transmitter 110 generates a retransmission version of the transmitted data packet, i.e. a retransmission subpacket or an initial transmission subpacket of a new data packet according to the feedback signal.

FIG. 2 illustrates a method for generating a subpacket using a circular buffer in a conventional mobile communication system.

Referring to FIG. 2, one code block 201 is a single data packet to be transmitted at a given time. For the input of the code block 201, an encoder 202 generates coded bits 203. The total number of the coded bits 203 is determined by the code rate of the encoder 202, a so-called mother code rate. The mother code rate is a term used for the code rate of the encoder 202 since all or part of the output of the encoder 202 is selected to generate a subpacket. The coded bits 203 are systematic bits S, first parity bits P1, and second parity bits P2, each of S, P1 and P2 being called a subblock. Subblock interleavers 204 interleave the subblocks of the systematic bits S, the first parity bits P1 and the second parity bits P2, respectively.

As illustrated in FIG. 2, the first parity bits P1 and the second parity bits P2 that were interleaved on a subblock basis are interlaced and then buffered in a circular buffer 205 or controlled with the same effect as if they were buffered in a circular buffer. As implied from the appellation of the circular buffer 205, bits are successively selected from the circular buffer 205 to configure a subpacket and after selection of the last buffered bit, bits are selected, returning to the first bit of the circular buffer 205. A transmitter generates a subpacket by selecting some successive bits from the circular buffer, and a receiver maps received coded bits to appropriate positions of a circular buffer with the same structure as that of the circular buffer used in the transmitter and decodes them.

In FIG. 2, reference numeral 206 denotes transmission of an initial transmission subpacket, reference numeral 207 denotes transmission of a first retransmission packet, i.e. a second subpacket, and reference numeral 208 denotes transmission of a second retransmission packet, i.e. a third subpacket.

FIG. 3 illustrates a conventional mapping between subpackets and resource blocks.

Referring to FIG. 3, reference numeral 301 denotes the output of the circular buffer 205 for a first code block, and reference numeral 302 denotes the output of the circular buffer 205 for a second code block. Each of the code blocks from the circular buffer 205 is composed of systematic bits and parity bits. Reference numeral 303 denotes a subpacket of the first code block, and reference numeral 304 denotes a subpacket of the second code block. The subpackets are interleaved independently, as indicated by reference numerals 305 and 306. Reference numeral 307 denotes the independently interleaved bits. Reference numeral 308 denotes mapping of the interleaved bits to available resources in time and frequency. The mapped coded bits are denoted by reference numeral 309. That is, reference numeral 309 denotes interleaved bits mapped to a first OFDM symbol.

In general, an OFDMA system transmits one data packet across a number of OFDM symbols and the time duration of the OFDM symbols is defined as a Transmission Time Interval (TTI). The first OFDM symbol refers to the first OFDM symbol of a TTI that carries a data packet. The number of coded bits transmitted in the first OFDM symbol is determined by the number of available subcarriers for data transmission and a modulation scheme.

Reference numeral 310 denotes a channel response in frequency. The vertical axis in the channel response represents channel strength. Therefore, a frequency in which the coded bits of the first code block are transmitted is in a good channel status, whereas a frequency in which the coded bits of the second code block are transmitted is in a bad channel status. This indicates that the receiver may receive the first code block with a high success probability and the second code block with a low success probability.

When a plurality of code blocks are transmitted during one TTI, it is typical in the HARQ system that a single ACK/NACK is fed back, instead of ACK/NACK feedbacks for the respective code blocks. For example, if coded bits for transmission in one OFDM symbol are selected from two code blocks and only one of the code blocks is successfully demodulated, the receiver feeds back a NACK. Then the transmitter selects coded bits again from previously transmitted two code blocks, generates all subpackets with the selected coded bits, and retransmits them. Therefore, it is preferable to transmit all code blocks over a constant channel in HARQ. However, because a real channel environment varies over time, the channel status may fluctuate over time as indicated by reference numeral 310 in FIG. 3. The significant channel status fluctuation in time leads to unnecessary retransmission between the transmitter and the receiver, thereby causing unnecessary resource consumption.

SUMMARY OF THE INVENTION

An aspect of the present invention is to address at least the problems and/or disadvantages and to provide at least the advantages described below. Accordingly, an aspect the present invention is to provide an interleaving apparatus and method for preventing unnecessary retransmission in a mobile communication system.

Another aspect of the present invention is to provide an interleaving apparatus and method for preventing unnecessary resource consumption in a mobile communication system.

A further aspect of the present invention is to provide an apparatus and method for efficiently interleaving bits, when a plurality of code blocks are transmitted in one transmission block in a mobile communication system.

In accordance with the present invention, there is provided an interleaving method in a wireless communication system, in which it is determined whether coded bits to be transmitted in one modulation symbol are selected from a plurality of code blocks, and the coded bits are interleaved on a modulation symbol basis, if the coded bits to be transmitted in the modulation symbol are selected from a plurality of code blocks. Before the determination, the coded bits can be interleaved on a code block basis. If the coded bits to be transmitted in the modulation symbol are not selected from a plurality of code blocks, the coded bits are interleaved on a code block basis. The modulation symbol can be an OFDM symbol.

In accordance with the present invention, there is provided an interleaving method in a wireless communication system, in which it is determined whether the number of code blocks to be transmitted in one TTI is larger than the number of modulation symbols available in the TTI, and coded bits selected from at least one of the code blocks and transmitted in one modulation symbol are interleaved on a modulation symbol basis, if the number of the code blocks to be transmitted in the TTI is larger than the number of the modulation symbols available in the TTI. The modulation symbol can be an OFDM symbol.

In accordance with the present invention, there is provided an interleaving apparatus in a wireless communication system, in which if coded bits to be transmitted in one modulation symbol are selected from a plurality of code blocks, a controller controls the coded bits to be provided to a symbol-based interleaver, and the symbol-based interleaver interleaves the coded bits on a modulation symbol basis. The interleaving apparatus may further include a block-based interleaver for interleaving the coded bits on a code block basis before the coded bits are provided to the symbol-based interleaver. The interleaving apparatus may further include a block-based interleaver for interleaving the coded bits on a code block basis, if the coded bits to be transmitted in the modulation symbol are not selected from a plurality of code blocks and in this case, the controller controls the coded bits to be provided to the block-based interleaver. The modulation symbol can be an OFDM symbol.

In accordance with the present invention, there is provided an interleaving apparatus in a wireless communication system, in which if the number of code blocks to be transmitted in one TTI is larger than the number of modulation symbols available in the TTI, a controller controls coded bits selected from at least one of the code blocks and transmitted in one modulation symbol to be provided to a symbol-based interleaver, and the symbol-based interleaver interleaves the coded bits on a modulation symbol basis. The modulation symbol can be an OFDM symbol.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In accordance with a preferred embodiment of the present invention, subpackets are generated from respective code blocks and interleaved on a code block basis. If a condition is satisfied, that is, if coded bits to be transmitted in an OFDM symbol are from a plurality of code blocks, all of the coded bits are interleaved again on a symbol basis.

Figure 4:
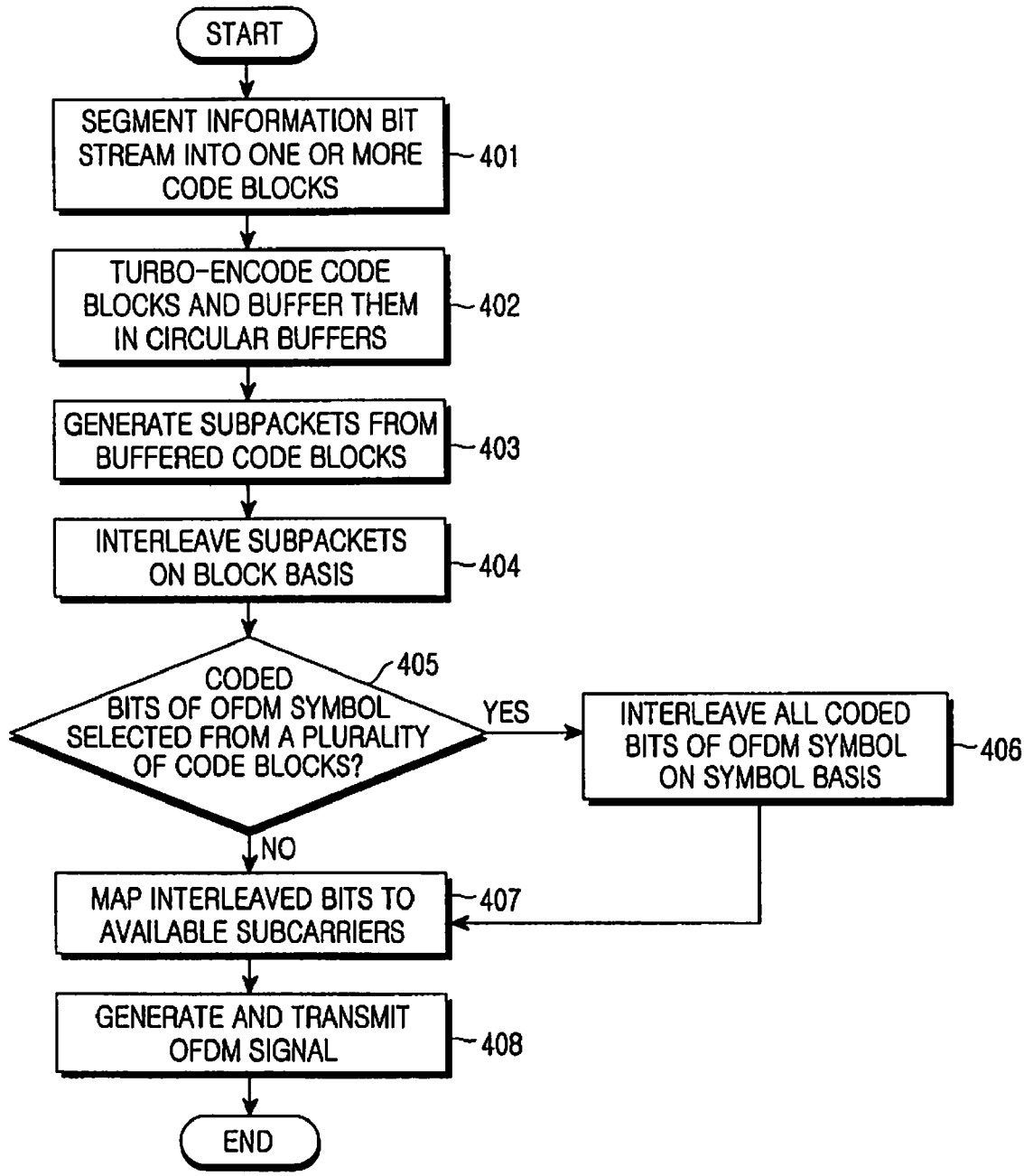
FIG. 4 illustrates a control operation for channel interleaving according to a first embodiment of the present invention.

FIG. 4 illustrates a control operation for channel interleaving according to the first embodiment of the present invention.

Referring to FIG. 4, a transmitter segments an information bit stream into one or more code blocks according to a rule in step 401. For example, if a Base Station (BS) is to transmit 10,000 information bits to a Mobile Station (MS) and uses a turbo encoder, the turbo encoder typically does not encode the 10,000 bits at one time because turbo coding of too much information at one time remarkably increases the decoding complexity of a receiver. Therefore, when a large number of information bits such as the 10,000-bit data are to be transmitted, they are segmented into two equal parts, i.e. each having 5000 bits and the 5000-bit streams are turbo-encoded separately.

Depending on system implementation, one information bit stream is segmented into a plurality of code blocks in a different manner. Hence, the present invention is not limited to a particular rule for dividing an information bit stream into a plurality of code blocks. It is difficult to describe such information bit stream division rules for all systems, and thus the description is omitted herein for the sake of conciseness.

Figure 1A:
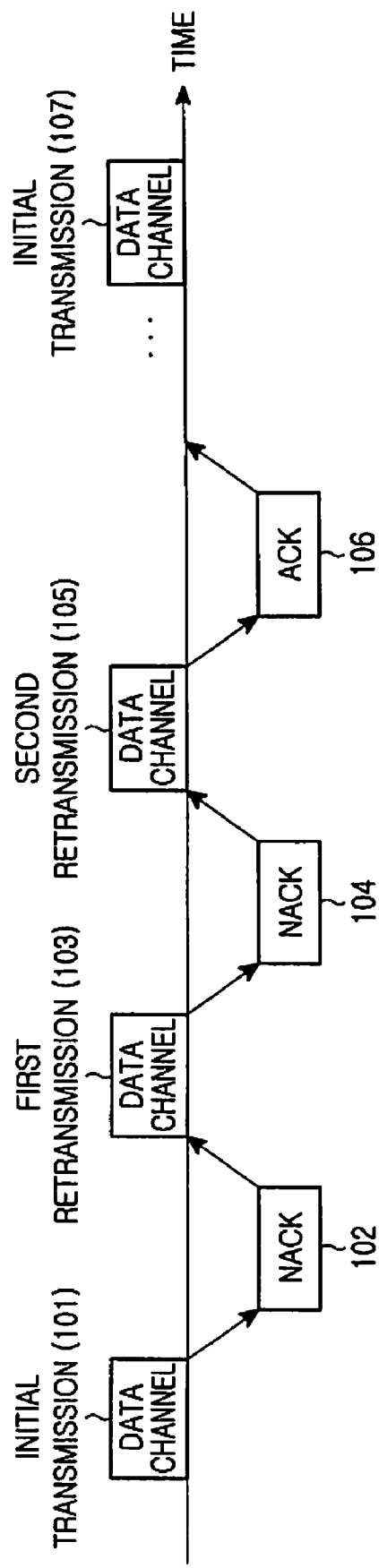
FIG. 1A illustrates the transmission timings of data and a signal, for describing the conventional HARQ.
Figure 1B:
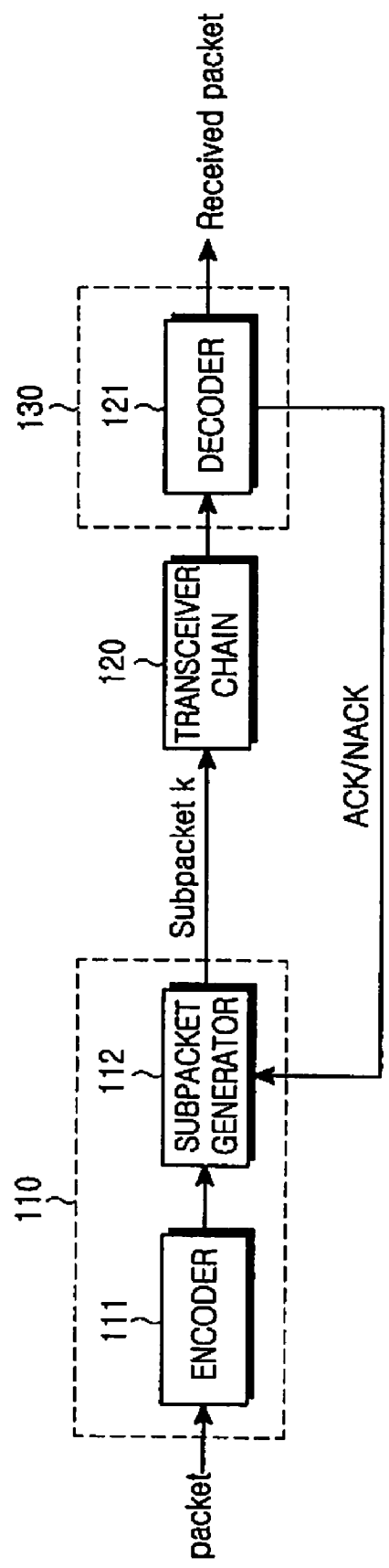
FIG. 1B is a block diagram of a transmitter and a receiver in a conventional OFDMA mobile communication system using HARQ.
Figure 2:
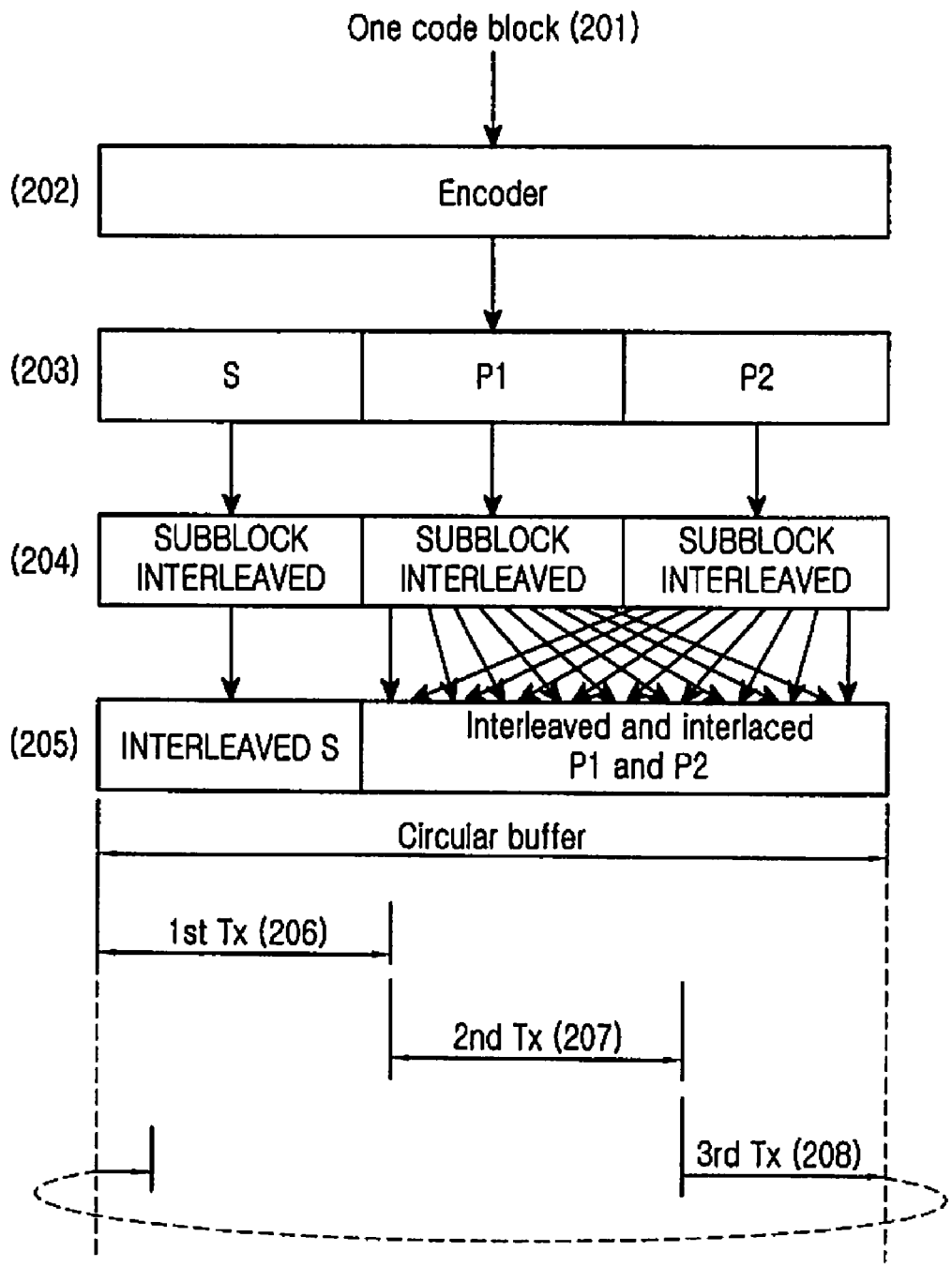
FIG. 2 illustrates a conventional method for generating a subpacket using a circular buffer in a mobile communication system.

In step 402, the transmitter turbo-encodes the one or more code blocks independently and buffers the coded bits in circular buffers. The circular buffers are configured conventionally as illustrated in FIG. 2. Then the transmitter generates subpackets from the respective circular buffers in a method in step 403. As described before with reference to FIG. 2, the subpackets are generated with successive coded bits selected from the circular buffers according to the conventional technology.

Figure 3:
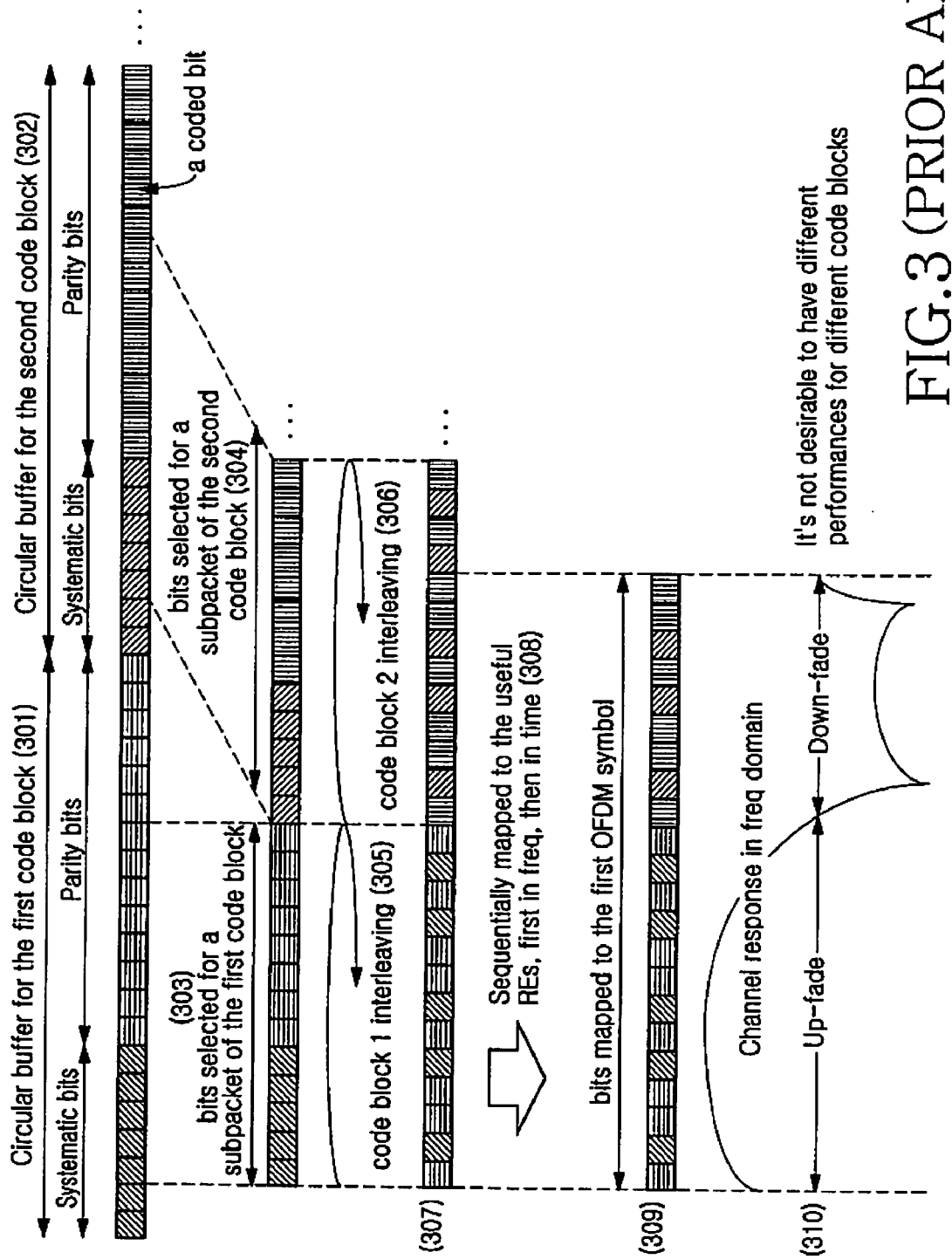
FIG. 3 illustrates conventional mapping between subpackets and resource blocks.

The transmitter interleaves the subpackets of the code blocks conventionally as illustrated in FIG. 3 in step 404. Hereinafter, independent interleaving of the coded bits of a subpacket for each code block will be referred to as block-based interleaving. In step 405, the transmitter determines whether coded bits to be transmitted in one OFDM symbol are from a plurality of code blocks. If the coded bits are selected from a plurality of code blocks, the transmitter interleaves all of the coded bits of the OFDM symbol again in step 406. Compared to block-based interleaving, the interleaving of the entire coded bits is referred to as symbol-based interleaving. In step 407, the transmitter sequentially maps the symbol-based interleaved bits to available subcarriers of the OFDM symbol.

On the other hand, if the coded bits of the OFDM symbol are from one code block in step 405, the transmitter proceeds to step 407. Then the transmitter generates an OFDM signal with the mapped bits in a method and transmits the OFDM signal in step 408.

While it has been described above that coded bits are mapped to resource blocks, the coded bits can be mapped to resource blocks after modulation in Quadrature Phase Shift Keying (QPSK), 16-ary Quadrature Amplitude Modulation (16QAM), or 64QAM, or the coded bits can be modulated after mapping to resource blocks, as is obvious to those skilled in the art. While the modulation is not described herein, it is to be clearly understood that the present invention is also applicable to the case where the modulation is performed.

Compared to the first embodiment of the present invention in which block-based interleaving is performed after subpackets are generated and if a condition is satisfied, i.e. if coded bits to be delivered in an OFDM symbol are from a plurality of code blocks, symbol-based interleaving is additionally performed, a second embodiment of the present invention is such that a decision is first made as to whether symbol-based interleaving is required, rather than block-based interleaving being performed immediately after subpackets are generated. That is, if coded bits to be transmitted in an OFDM symbol are from a plurality of code blocks, symbol-based interleaving is performed and otherwise, block-based interleaving is performed.

Figure 5:
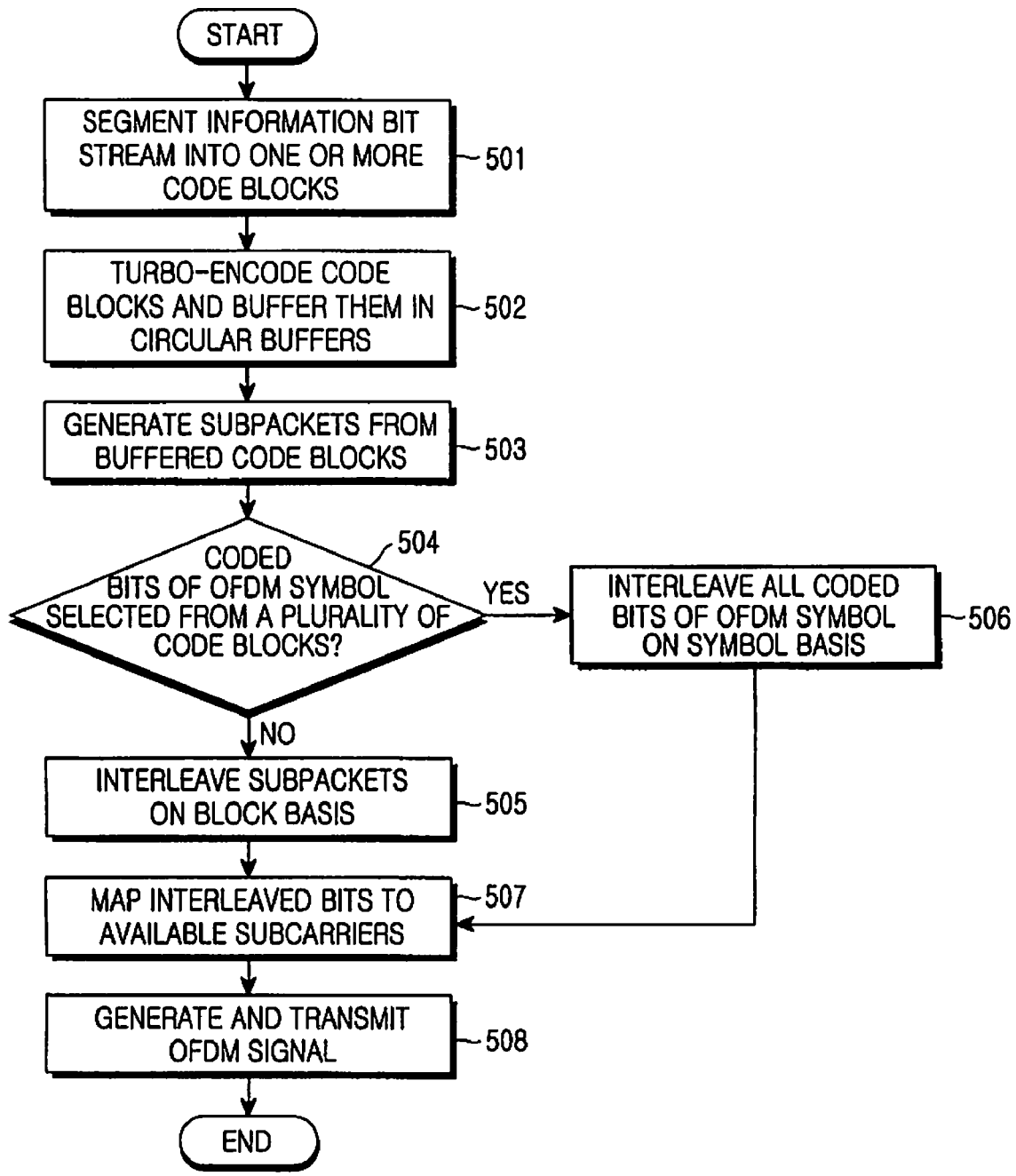
FIG. 5 illustrates a control operation for channel interleaving according to a second embodiment of the present invention.

FIG. 5 illustrates a control operation for channel interleaving according to the second embodiment of the present invention.

Referring to FIG. 5, the transmitter segments an information bit stream into one or more code blocks according to a rule in step 501. Step 501 can be performed in the same manner as step 401 of FIG. 4. In step 502, the transmitter turbo-encodes the one or more code blocks independently and buffers the coded bits in circular buffers. The circular buffers can be configured in the manner illustrated in FIG. 2. Then the transmitter generates subpackets from the circular buffers in a method in step 503.

As described before with reference to FIG. 2, the subpackets are configured with successive coded bits selected from the circular buffers. Then the transmitter determines whether coded bits to be transmitted in one OFDM symbol are to be selected from a plurality of code blocks in step 504. If the coded bits are to be selected from a plurality of code blocks, the transmitter interleaves the coded bits on a symbol basis in step 505.

If the coded bits of the OFDM symbol are to be from one code block in step 504, the transmitter interleaves the coded bits on a block basis in step 506. In step 507, the transmitter sequentially maps the interleaved bits to available subcarriers of the OFDM symbol. Then the transmitter generates an OFDM signal with the mapped bits in a method and transmits the OFDM signal in step 508.

Figure 6:
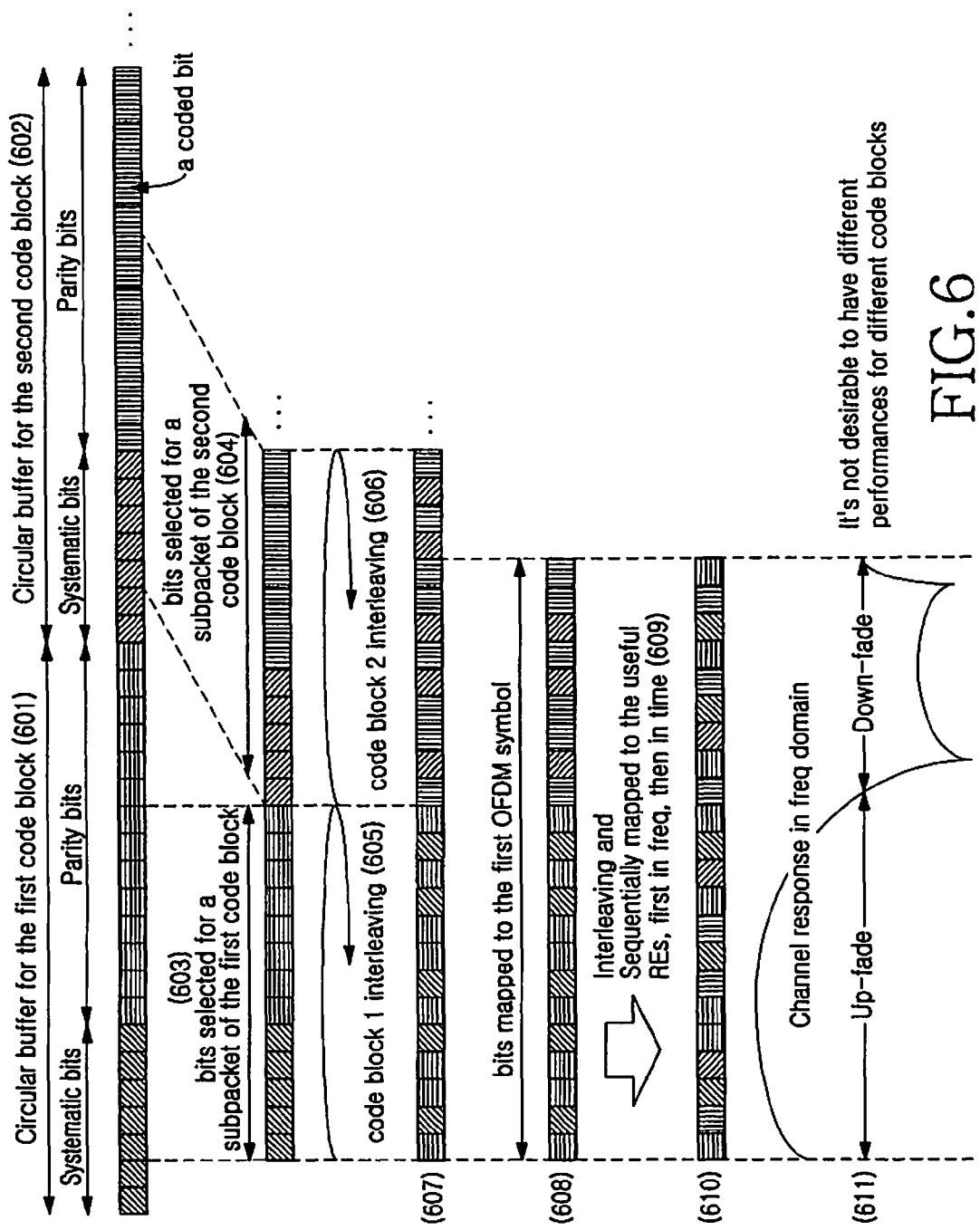
FIG. 6 illustrates an operation for configuring transmission data according to the first embodiment of the present invention.

FIG. 6 illustrates an operation for configuring transmission data according to the first embodiment of the present invention.

Referring to FIG. 6, reference numerals 601 and 602 denote circular buffers for first and second code blocks, respectively. Reference numerals 603 and 604 denote a subpacket of the first code block and a subpacket of the second code block, respectively. The subpackets are independently interleaved on a block basis, as indicated by reference numerals 605 and 606. Reference numeral 607 denotes the interleaved bits. Reference numeral 608 denotes coded bits to be transmitted in a first OFDM symbol.

In FIG. 4, when one OFDM symbol is to deliver coded bits that are from a plurality of coded blocks in step 405, symbol-based interleaving is performed additionally in step 406. This symbol-based interleaving is indicated by reference numerals 609 and 610. As indicated by reference numerals 610 and 611, the coded bits of the two code blocks experience a good channel and a bad channel uniformly. This solves the problem in the conventional technology of one code block having a high reception success probability and another code block has a low reception success probability.

Figure 7:
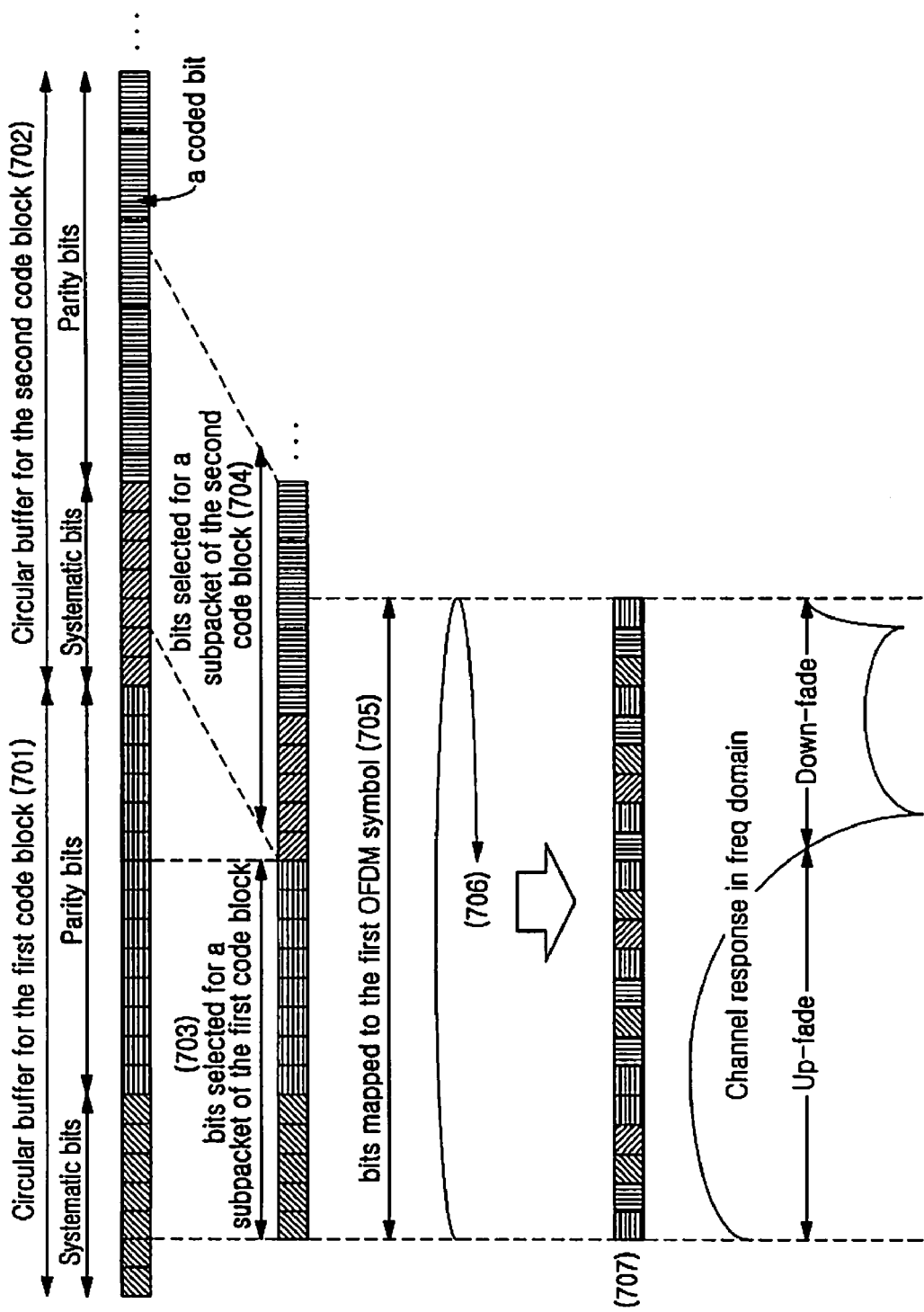
FIG. 7 illustrates an operation for configuring transmission data according to the second embodiment of the present invention.

FIG. 7 illustrates an operation for configuring transmission data according to the second embodiment of the present invention.

Referring to FIG. 7, reference numerals 701 and 702 denote circular buffers for first and second code blocks, respectively. Reference numerals 703 and 704 denote a subpacket of the first code block and a subpacket of the second code block, respectively. Reference numeral 705 denotes coded bits to be transmitted in a first OFDM symbol among the coded bits 703 and 704. In FIG. 5, as one OFDM symbol is to deliver coded bits that are from a plurality of coded blocks in step 505, symbol-based interleaving is performed in step 505. This symbol-based interleaving is indicated by reference numeral 706. Reference numeral 707 denotes the interleaved bits. As noted, the coded bits of the two code blocks experience a good channel and a bad channel uniformly. This solves the problem in the conventional technology of one code block having a high reception success probability and another code block has a low reception success probability.

Figure 8:
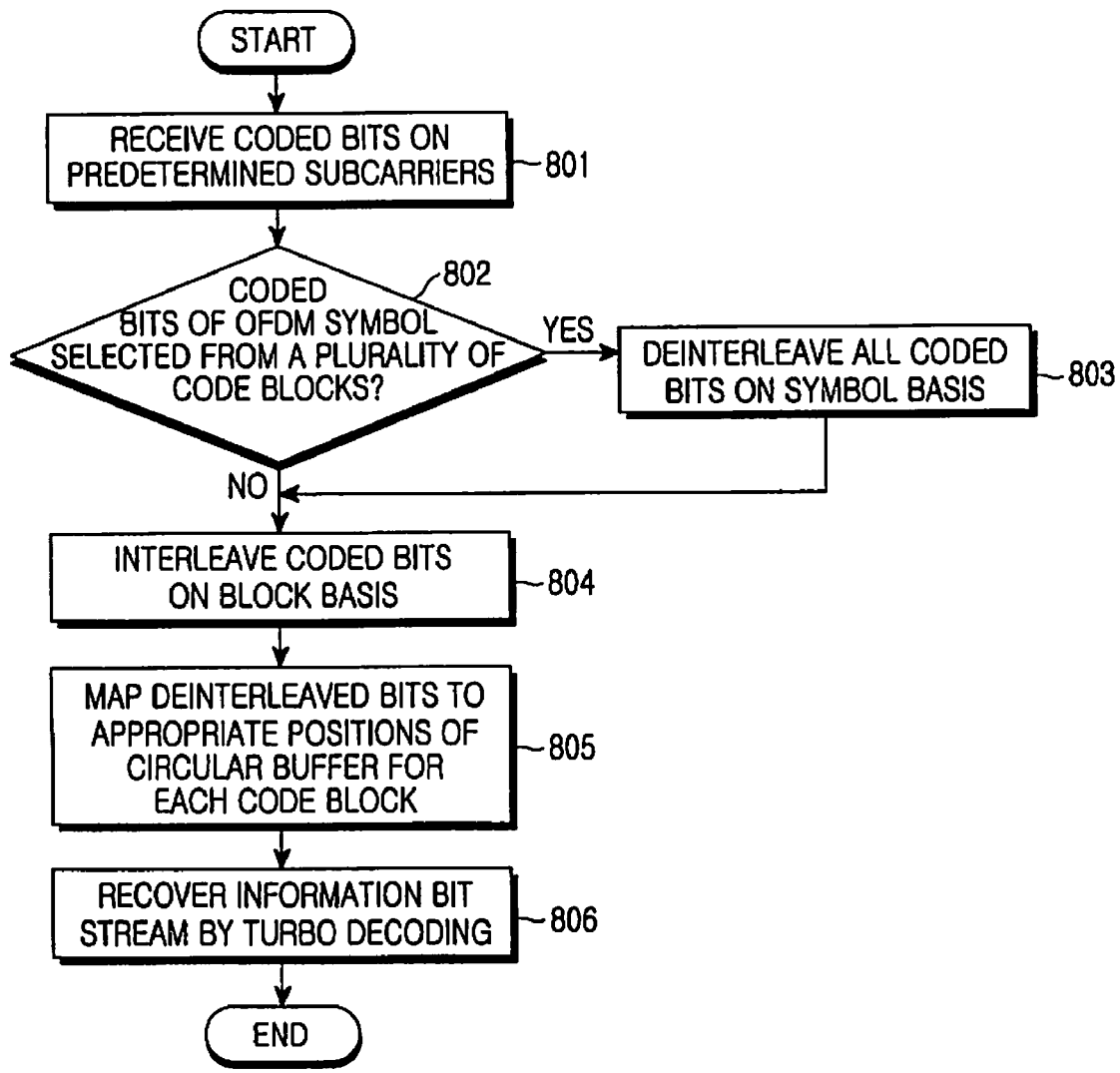
FIG. 8 illustrates a control operation of a receiver according to the first embodiment of the present invention.

FIG. 8 illustrates a control operation of a receiver according to the first embodiment of the present invention.

Referring to FIG. 8, the receiver receives coded bits of an OFDM symbol on subcarriers that are agreed between the receiver and the transmitter in step 801. The agreement can be made in many ways, a particular one of which the present invention is not limited to. The receiver determines whether the coded bits are from a plurality of code blocks in step 802. If the coded bits are from a plurality of code blocks, the receiver deinterleaves the coded bits on a symbol basis in step 803. The symbol-based deinterleaving is the reverse operation of symbol-based interleaving. Then the receiver proceeds to step 804.

On the contrary, if the coded bits are from a single code block in step 802, the receiver deinterleaves the coded bits on a block basis in step 804. The block-based deinterleaving is the reverse operation of block-based interleaving. In step 805, the receiver maps the deinterleaved coded bits of step 803 or step 804 to appropriate positions in a circular buffer for each code block. Then the receiver turbo-decodes the buffered bits in step 806.

Figure 9:
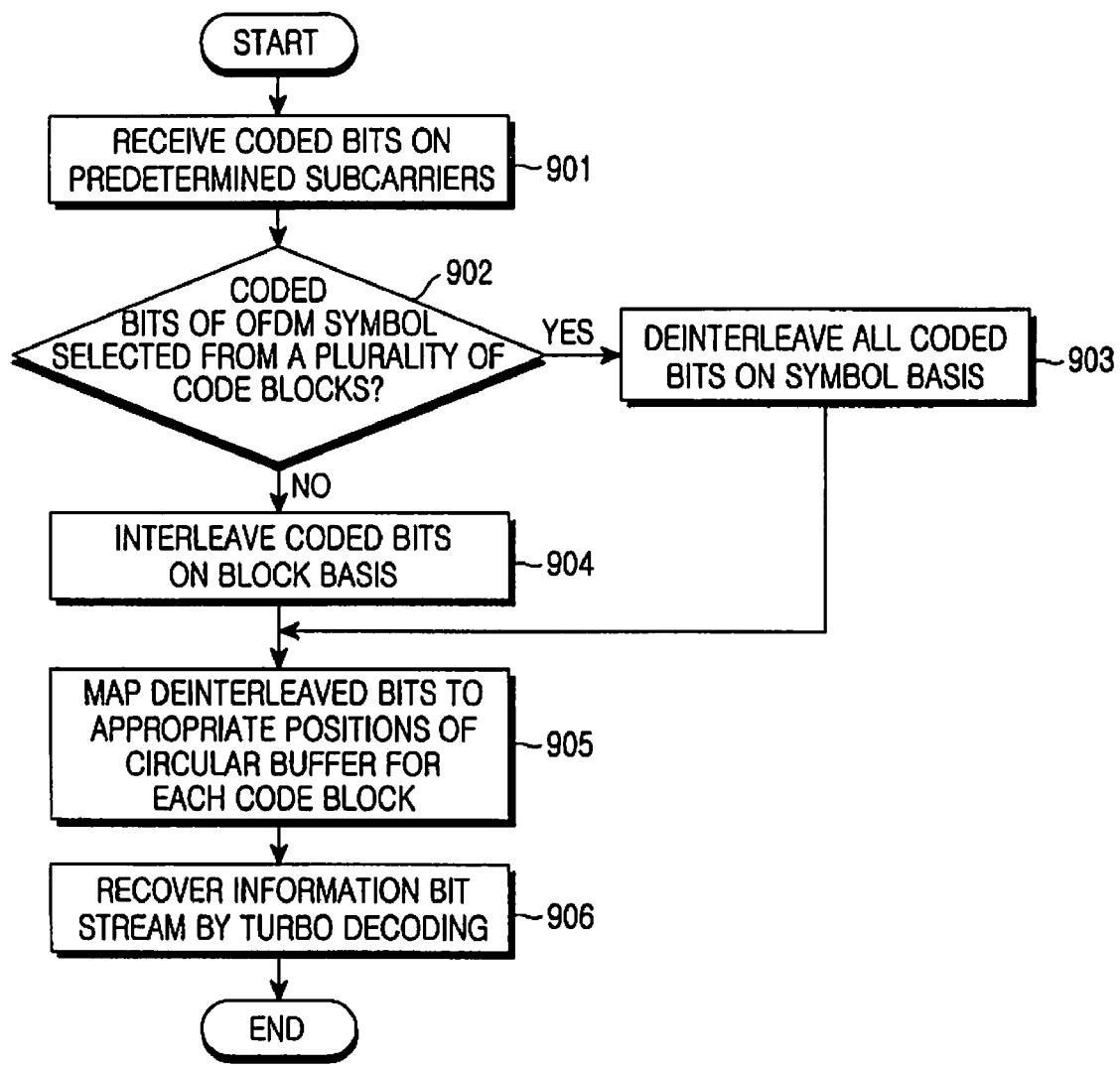
FIG. 9 illustrates a control operation of a receiver according to the second embodiment of the present invention.

FIG. 9 illustrates a control operation of a receiver according to the second embodiment of the present invention.

Referring to FIG. 901, the receiver receives coded bits of an OFDM symbol on subcarriers in step 901 and determines whether the coded bits are from a plurality of code blocks in step 902. If the coded bits are from a plurality of code blocks, the receiver deinterleaves the coded bits on a symbol basis in step 903. If the coded bits are from a single code block in step 902, the receiver deinterleaves the coded bits on a subpacket basis, that is, on a block basis in step 904. In step 905, the receiver maps the deinterleaved coded bits of step 903 or step 904 to appropriate positions in a circular buffer for each code block. Then the receiver turbo-decodes the buffered bits in step 906.

Figure 10:
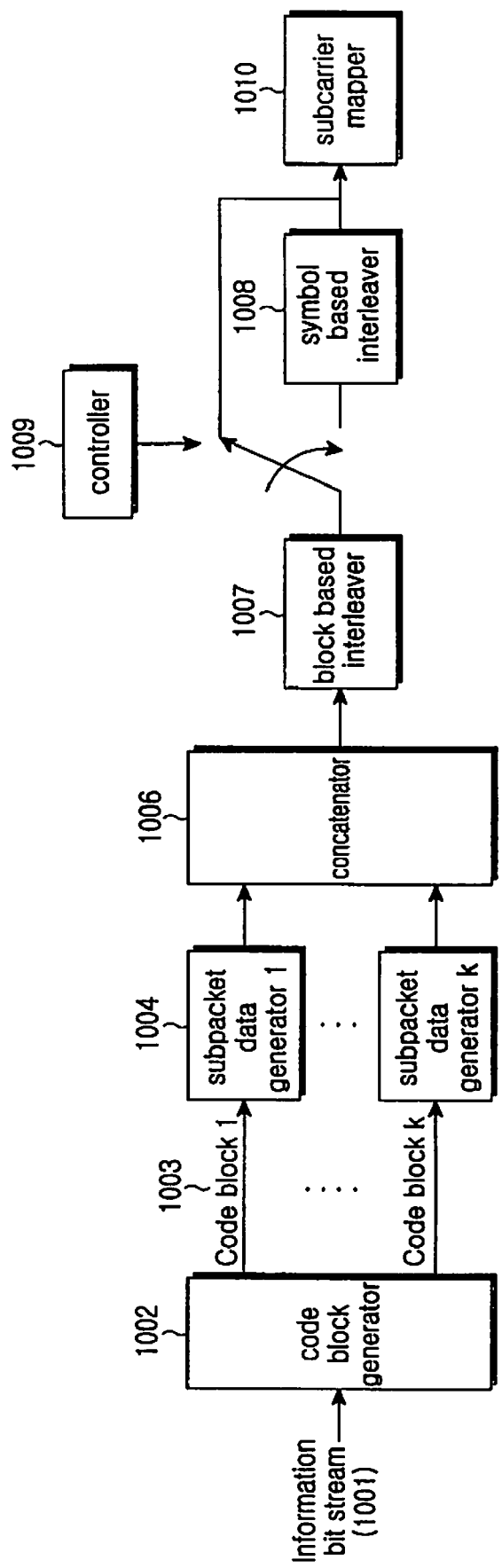
FIG. 10 illustrates important components of a transmitter according to the first embodiment of the present invention.

FIG. 10 illustrates important components of a transmitter according to the first embodiment of the present invention.

Referring to FIG. 10, a code block generator 1002 segments a received information bit stream 1001 into one or more code blocks 1003 according to a rule in the same manner as in step 401 of FIG. 4 and provides the code blocks 1003 to subpacket data generators 1004, respectively. The subpacket data generators 1004, each including a turbo encoder, a circular buffer, and a subpacket generator, encode the code blocks 1003, buffer them in the circular buffers, and generate subpackets with the buffered coded bits. The subpacket data generators 1004 may have real circular buffers or control their outputs with the same effect as if the coded bits were buffered in circular buffers.

Depending on system requirements, each subpacket data generator 1004 may be provided with additional components, may have replacements for existing components, or may be without some existing components. While each of the subpacket data generators 1004 is shown to a single block, it can be configured to have a plurality of function blocks, for example, a turbo encoder, a circular buffer, and a subpacket generator.

A concatenator 1006 concatenates the subpackets received from the subpacket data generators 1004. A block-based interleaver 1007 receives the concatenated subpackets block by block and interleaves the received subpackets on a block basis.

Under the control of a controller 1009, the block-based interleaved bits are provided to a symbol-based interleaver 1008 or directly to a subcarrier mapper 1010. Herein, the control operation of the controller 1009 corresponds to steps 405, 406 and 407 of FIG. 4. Specifically, if an OFDM symbol carries coded bits that come from a plurality of code blocks, the controller 1009 controls such that the block-based interleaver 1007 switches to the symbol-based interleaver 1008. Otherwise, the controller 1009 controls such that the block-based interleaver 1007 switches to the subcarrier mapper 1010. The symbol-based interleaver 1008 interleaves the block-based interleaved bits on a symbol basis, and the subcarrier mapper 1010 sequentially maps received bits to subcarriers available for the OFDM symbol.

Figure 11:
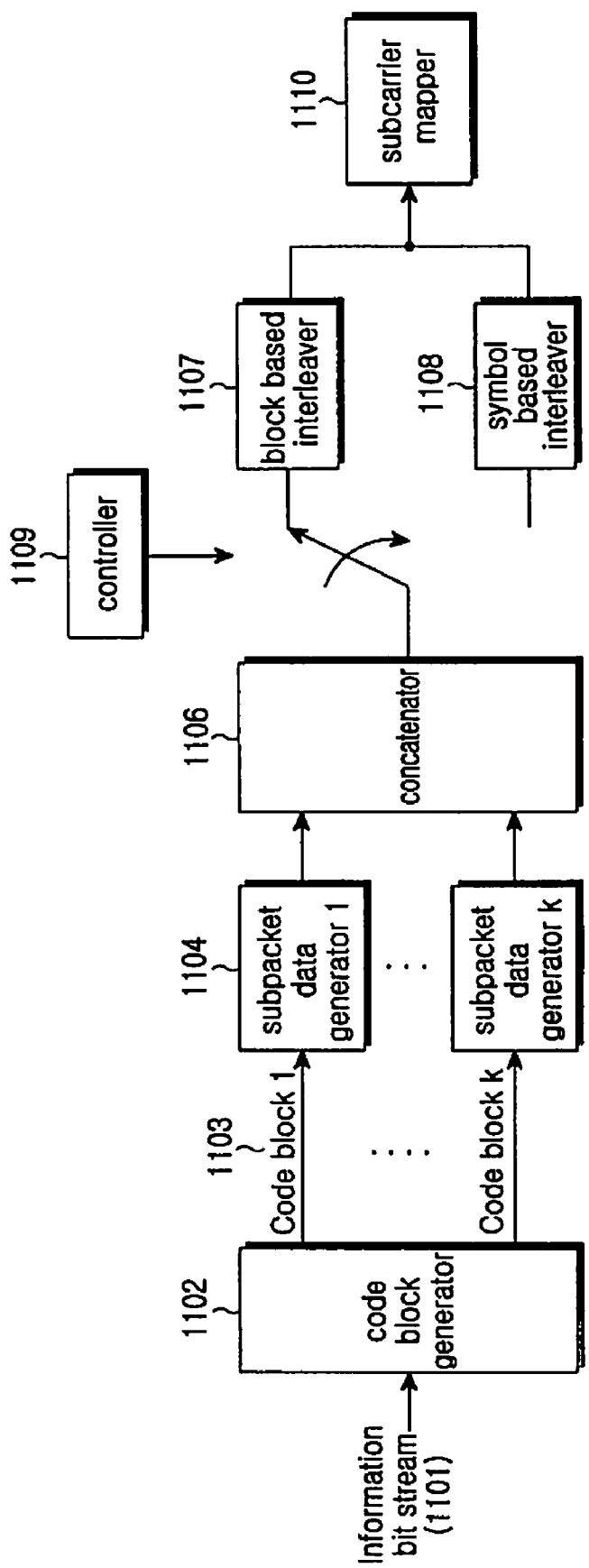
FIG. 11 illustrates important components of a transmitter according to the second embodiment of the present invention.

FIG. 11 illustrates important components of a transmitter according to the second embodiment of the present invention.

Referring to FIG. 11, a code block generator 1102 segments a received information bit stream 1101 into one or more code blocks 1103 according to a rule and provides the code blocks 1103 to subpacket data generators 1104, respectively. The subpacket data generators 1104, each including a turbo encoder, a circular buffer, and a subpacket generator, generate subpackets with the code blocks 1103.

While each of the subpacket data generators 1004 has a turbo encoder, a circular buffer, and a subpacket generator in FIG. 11, it may have additional components, some components replaced by other components, or may lack some of the illustrated components. While each of the subpacket data generators 1104 is shown to be a single block, it can be configured to have a plurality of function blocks, as described before with reference to FIG. 10.

A concatenator 1106 concatenates the one or more subpackets received from the subpacket data generators 1104. Under the control of a controller 1109, the concatenated subpackets are provided to a block-based interleaver 1107 or a symbol-based interleaver 1108. Herein, the control operation of the controller 1109 corresponds to steps 504, 505 and 506 of FIG. 5.

Specifically, if an OFDM symbol carries coded bits that come from a plurality of code blocks, the controller 1109 controls such that the concatenator 1106 switches to the symbol-based interleaver 1108. Otherwise, the controller 1109 controls such that the concatenator 1106 switches to the block-based interleaver 1107. The block-based interleaver 1107 receives the concatenated subpackets and interleaves them on a block basis. The symbol-based interleaver 1108 interleaves the concatenated subpackets on a symbol basis. A subcarrier mapper 1110 sequentially maps the block-based or symbol-based interleaved bits to subcarriers available for the OFDM symbol.

Figure 12:
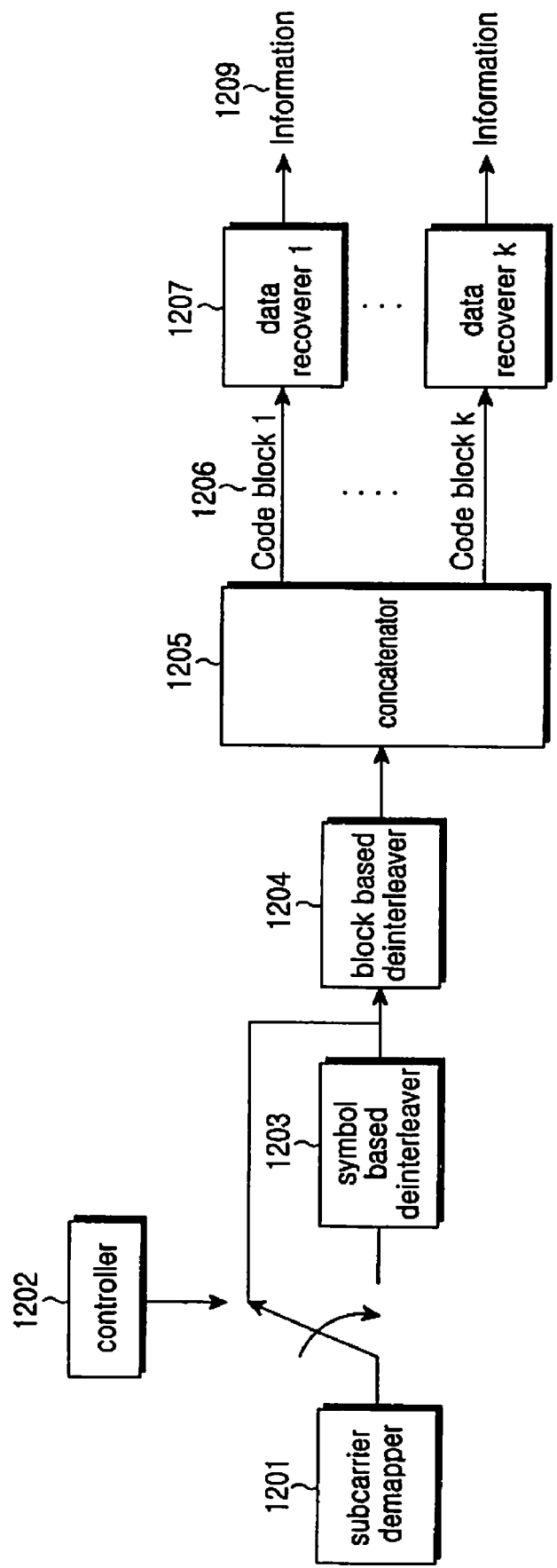
FIG. 12 illustrates important components of a receiver according to the first embodiment of the present invention.

FIG. 12 illustrates important components of a receiver according to the first embodiment of the present invention.

Referring to FIG. 12, a subcarrier demapper 1201 receives coded bits on subcarriers as in step 801 of FIG. 8. Under the control of a controller 1202, the output of the subcarrier demapper 1201 is provided to a symbol-based deinterleaver 1203 or a block-based deinterleaver 1204. The symbol-based deinterleaver 1203 deinterleaves the received coded bits on a symbol basis. The block-based deinterleaver 1204 deinterleaves received coded bits on a block basis. The control operation of the controller 1202 corresponds to steps 802, 803 and 804 of FIG. 8. Specifically, if coded bits received in an OFDM symbol are from a plurality of code blocks, the controller 1202 switches the subcarrier demapper 1201 to the symbol-based deinterleaver 1203. Otherwise, the controller 1202 switches the subcarrier demapper 1201 to the block-based deinterleaver 1204.

A concatenator 1205 concatenates the block-based deinterleaved bits and data recoverers 1207 recover information 1209 from the concatenated bits on a code block basis. The data recovery involves buffering in a circular buffer, turbo decoding, and demodulation, as previously explained.

Figure 13:
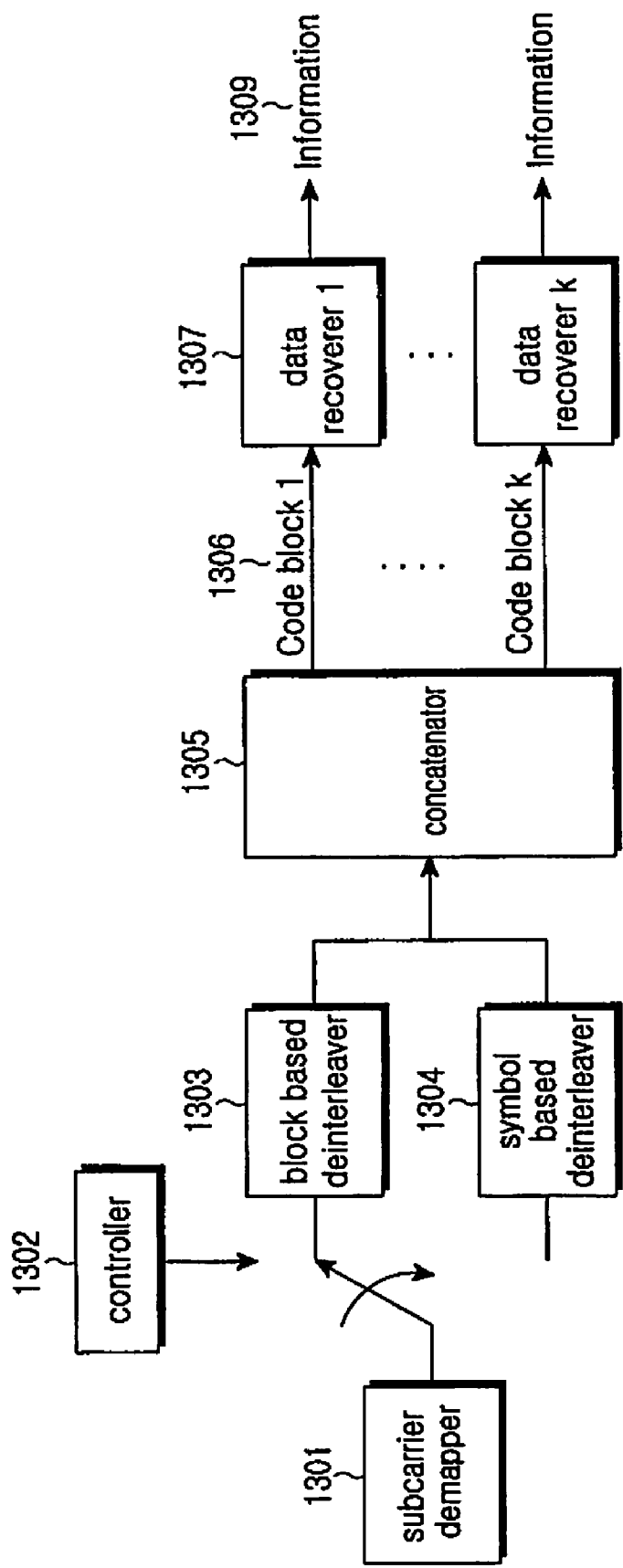
FIG. 13 illustrates important components of a receiver according to the second embodiment of the present invention.

FIG. 13 illustrates important components of a receiver according to the second embodiment of the present invention.

Referring to FIG. 13, a subcarrier demapper 1301 receives coded bits on subcarriers as in step 901 of FIG. 9. Under the control of a controller 1302, the output of the subcarrier demapper 1301 is provided to a symbol-based deinterleaver 1304 or a block-based deinterleaver 1303. The block-based deinterleaver 1303 deinterleaves the received coded bits on a block basis. The symbol-based deinterleaver 1304 deinterleaves the received coded bits on a symbol basis. The control operation of the controller 1302 corresponds to steps 902, 903 and 904 of FIG. 9. Specifically, if coded bits received in an OFDM symbol are from a plurality of code blocks, the controller 1302 switches the subcarrier demapper 1301 to the symbol-based deinterleaver 1304. Otherwise, the controller 1302 switches the subcarrier demapper 1301 to the block-based deinterleaver 1303.

A concatenator 1305 concatenates the symbol-based or block-based deinterleaved bits and data recoverers 1307 recover information 1309 from the concatenated bits on a code block basis. The data recovery involves buffering in a circular buffer, turbo decoding, and demodulation, as stated before.

A third embodiment of the present invention differs from the first and second embodiments, in terms of a symbol-based interleaving condition. In the first and second embodiments, the condition is whether the coded bits of an OFDM symbol are from a plurality of code blocks, whereas in the third embodiment, the condition is whether the number of code blocks transmitted during a TTI is larger than that of OFDM symbols available for data transmission during the TTI.

For example, given three available OFDM symbols and four code blocks, coded bits from 1.33 code blocks are transmitted per OFDM symbol on the average. In this case, it may appear that the first, second and third embodiments of the present invention use the same condition. However, it may occur depending on system implementation that OFDM symbol 1 includes coded bits from two code blocks, and OFDM symbols 2 and 3 each include coded bits from one code block. In this context, the conditions are different in the third embodiment as compared to the first and second embodiments.

Figure 14:
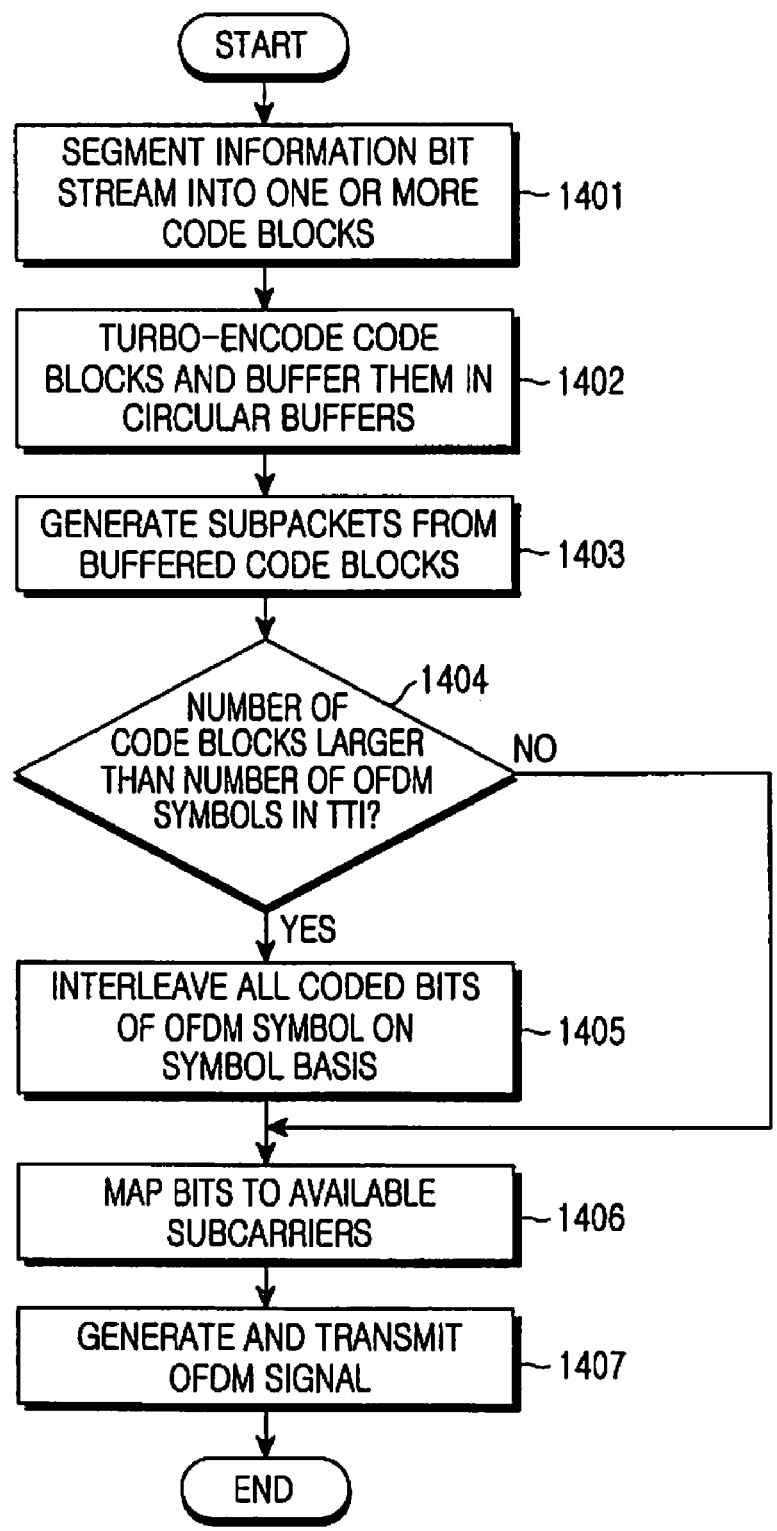
FIG. 14 illustrates a control operation for channel interleaving according to a third embodiment of the present invention.

FIG. 14 illustrates a control operation for channel interleaving according to the third embodiment of the present invention.

Referring to FIG. 14, a transmitter segments an information bit stream into one or more code blocks according to a rule as in FIG. 4 in step 1401. In step 1402, the transmitter turbo-encodes the one or more code blocks independently and buffers the coded bits in circular buffers. The circular buffers are configured as illustrated in FIG. 2. Then the transmitter generates subpackets from the circular buffers in a method in step 1403. As described before with reference to FIG. 2, the subpackets are configured with successive coded bits selected from the circular buffers.

The transmitter determines whether the number of code blocks transmitted in a TTI is larger than that of OFDM symbols available for data transmission in the TTI in step 1404. If the answer is affirmative, symbol-based interleaving is performed in step 1405.

If the answer is negative in step 1404, interleaving is not performed because despite no interleaving, transmission/reception performance is not affected much in this case. Then the transmitter sequentially maps the coded bits to available subcarriers for an OFDM symbol in step 1406 and generates an OFDM signal with the mapped coded bits in a method and transmits the OFDM signal in step 1407.

Figure 15:
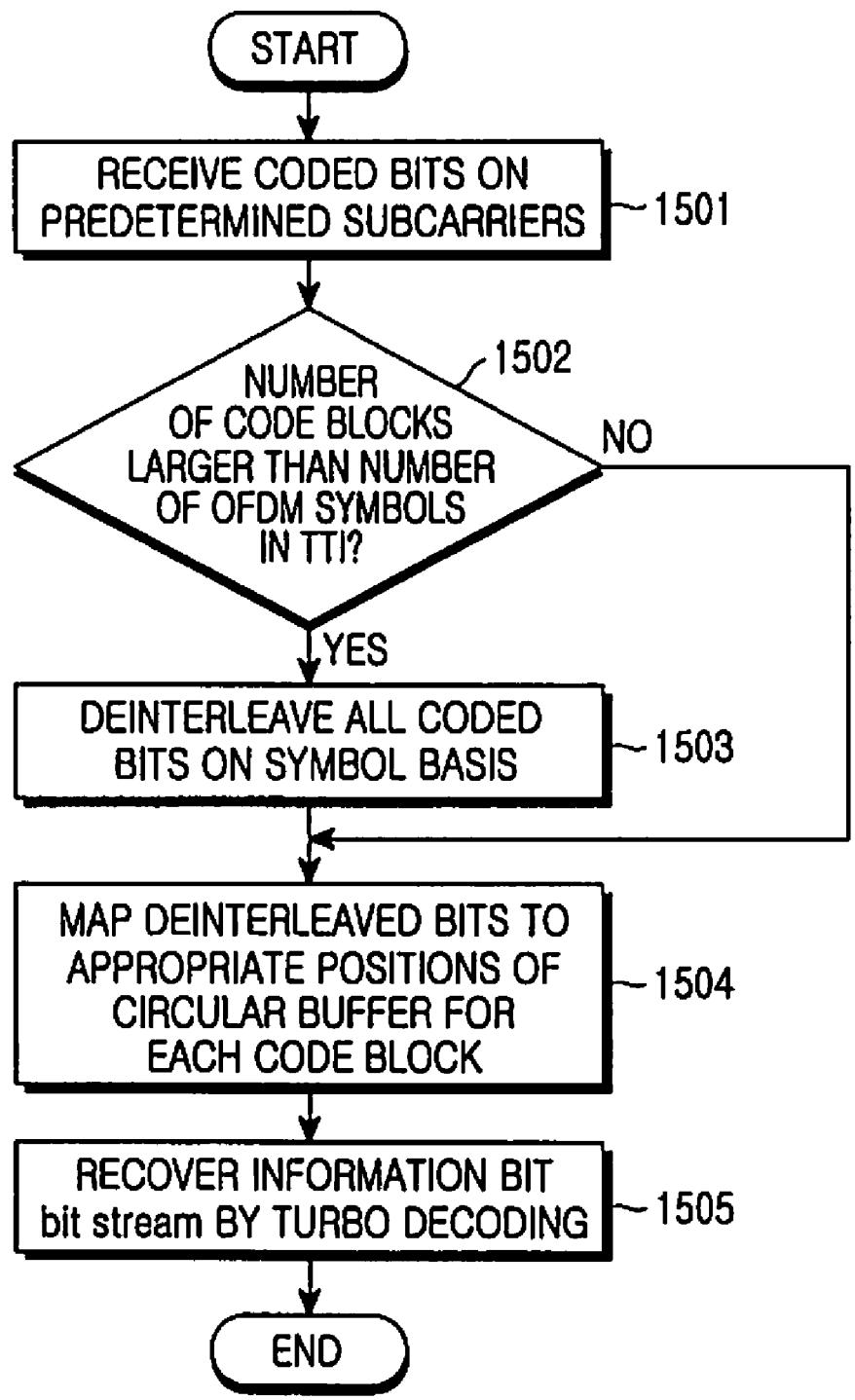
FIG. 15 illustrates a control operation of a receiver according to the third embodiment of the present invention.

FIG. 15 illustrates a control operation of a receiver according to the third embodiment of the present invention.

Referring to FIG. 15, the receiver receives coded bits on subcarriers in step 1501 and determines whether the number of code blocks transmitted in a TTI is larger than that of OFDM symbols available for data transmission in the TTI in step 1502. If the answer is affirmative, the receiver deinterleaves the coded bits on a symbol basis in step 1503 and proceeds to step 1504. If the answer is negative, the receiver directly proceeds to step 1504 without deinterleaving. In step 1504, the receiver maps the coded bits to appropriate positions in a circular buffer for each code block. Then the receiver turbo-decodes the buffered bits in step 1505.

Figure 16:
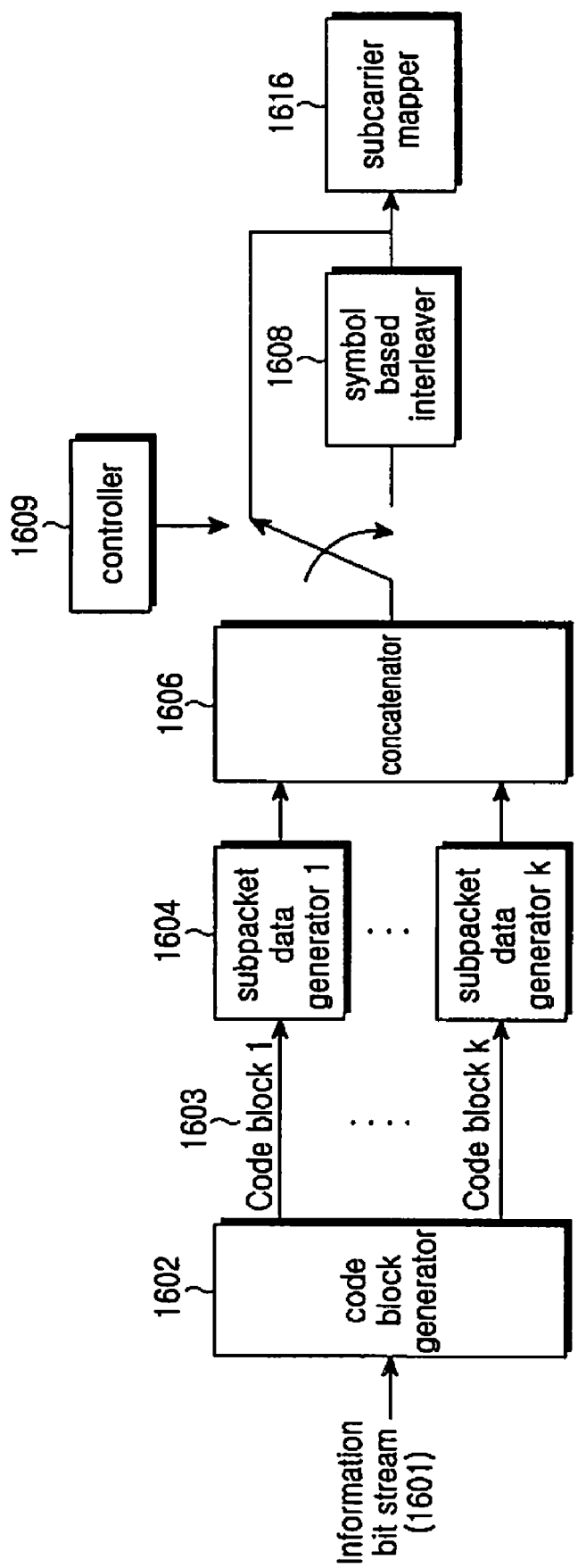
FIG. 16 illustrates important components of a transmitter according to the third embodiment of the present invention.

FIG. 16 illustrates important components of a transmitter according to the third embodiment of the present invention.

Referring to FIG. 16, a code block generator 1602 segments a received information bit stream 1601 into one or more code blocks 1603 according to a rule and provides the code blocks 1603 to subpacket data generators 1604, respectively. The subpacket data generators 1604, each including a turbo encoder, a circular buffer, and a subpacket generator, generate subpackets with the code blocks 1603.

While each of the subpacket data generators 1604 has a turbo encoder, a circular buffer, and a subpacket generator in FIG. 11, it may have additional components, some components replaced by other components, or may lack some illustrated components. While each of the subpacket data generators 1604 is shown to be a single block, it can be configured to have a plurality of function blocks in real implementation.

A concatenator 1606 concatenates the one or plurality of subpackets received from the subpacket data generators 1604. Under the control of a controller 1609, the concatenated subpackets are provided to a symbol-based interleaver 1608 or a subcarrier mapper 1616. Herein, the control operation of the controller 1609 corresponds to steps 1404, 1405 and 1406 of FIG. 14.

Specifically, if the number of code blocks transmitted in a TTI is larger than that of OFDM symbols available for data transmission in the TTI, the controller 1609 switches the concatenator 1606 to the symbol-based interleaver 1608. Otherwise, the controller 1609 switches the concatenator 1606 to the subcarrier mapper 1616. The symbol-based interleaver 1608 interleaves the concatenated subpackets on a symbol basis. The subcarrier mapper 1616 sequentially maps the symbol-based interleaved bits or the concatenated subpackets to subcarriers available for an OFDM symbol.

Figure 17:
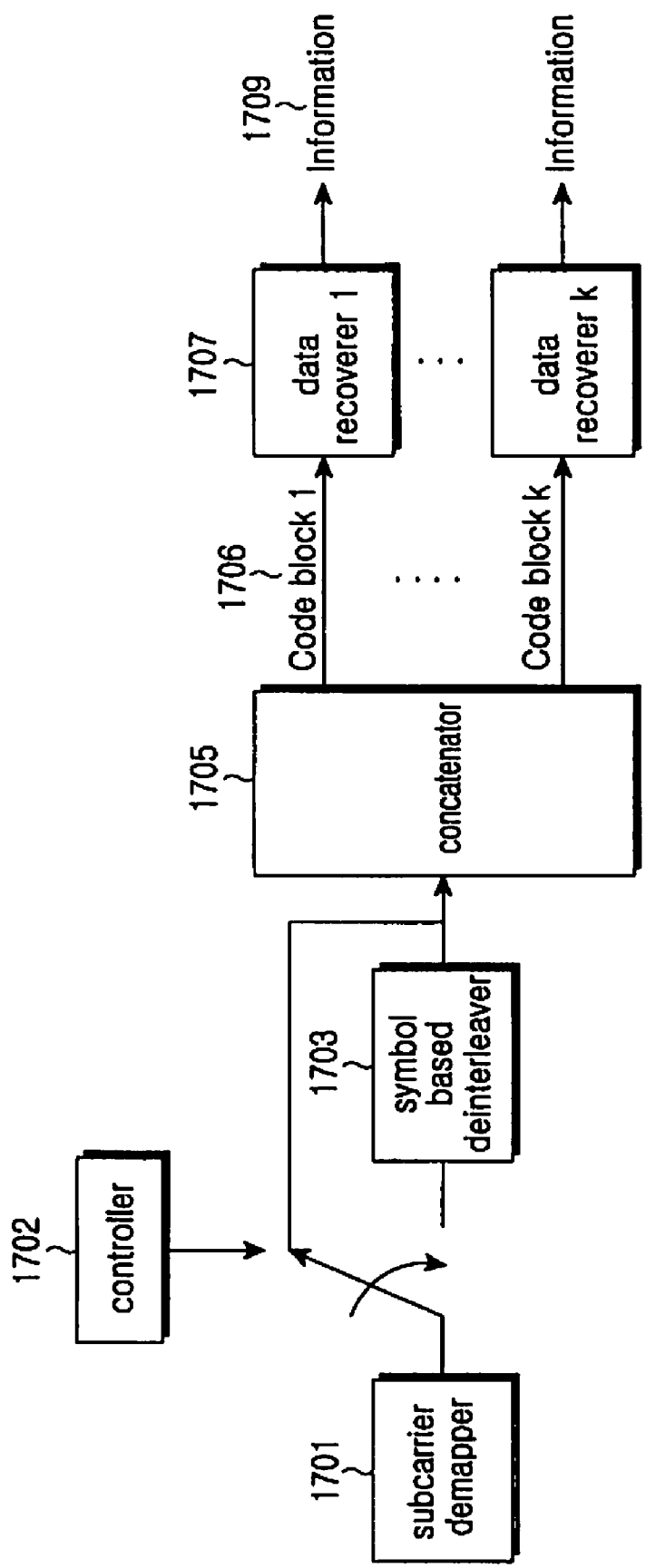
FIG. 17 illustrates important components of a receiver according to the third embodiment of the present invention.

FIG. 17 illustrates important components of a receiver according to the third embodiment of the present invention.

Referring to FIG. 17, a subcarrier demapper 1701 receives coded bits on subcarriers as in step 1501 of FIG. 15. Under the control of a controller 1702, the output of the subcarrier demapper 1701 is provided to a symbol-based deinterleaver 1703 or a concatenator 1705. The symbol-based deinterleaver 1703 deinterleaves the received coded bits on a symbol basis. The control operation of the controller 1702 corresponds to steps 1502, 1503 and 1504 of FIG. 15.

Specifically, if the number of code blocks transmitted in a TTI is larger than that of OFDM symbols available for data transmission in the TTI, the controller 1702 switches the subcarrier demapper 1701 to the symbol-based deinterleaver 1703. Otherwise, the controller 1702 switches the subcarrier demapper 1701 to the concatenator 1705. The concatenator 1705 concatenates the symbol-based deinterleaved bits or the demapped coded bits and data recoverers 1707 recover information 1709 from the concatenated bits on a code block basis. The data recovery involves buffering in a circular buffer, turbo decoding, and demodulation, as previously explained.

Besides the above described first, second and third embodiments of the present invention, other modified embodiments can be contemplated, which will be described below. For notational simplicity, the conditions set forth in the first, second and third embodiments of the present invention will be represented as Condition A (for the first and second embodiments) and Condition B (for the third embodiment), respectively.

Condition A relates to whether the coded bits of an OFDM symbol are from a plurality of code blocks in the first and second embodiments of the present invention. Condition B relates to whether the number of code blocks transmitted in a TTI is larger than that of OFDM symbols available for data transmission in the TTI in the third embodiment of the present invention. Embodiments of the present invention that are contemplated are summarized in Table 1 based on Condition A and Condition B. As deinterleaving is the reverse operation of interleaving, embodiments of deinterleaving being the counterparts of the embodiments illustrated in Table 1 will not be described herein.

TABLE 1

| Symbol-based interleaving condition | Block-based interleaving | Timing of block-based interleaving | Notes | |
|---|---|---|---|---|
| A | ○ | Before symbol-based interleaving | Embodiment 1 | (1) |
|  |  | When condition is not satisfied | Embodiment 2 | (2) |
|  | X | — | — | (3) |
| B | ○ | Before symbol-based interleaving | — | (4) |
|  |  | When condition is not satisfied | — | (5) |
|  | X | — | Embodiment 3 | (6) |

Referring to Table 1, symbol-based interleaving conditions are considered in all embodiments of the present invention. The symbol-based interleaving conditions can be Condition A and Condition B. In the present invention, block-based interleaving is optional. If block-based interleaving is performed, it always occurs before symbol-based interleaving, or when a symbol-based interleaving condition is not met. Based on this idea, then, six embodiments of the present invention can be contemplated as listed in Table 1.

(1) Block-based interleaving always occurs and if Condition A is met, symbol-based interleaving is additionally performed (i.e. the first embodiment).

(2) If Condition A is met, only symbol-based interleaving is performed and if Condition A is not met, only block-based interleaving is performed (i.e. the second embodiment).

(3) Block-based interleaving does not occur in any case. If Condition A is met, symbol-based interleaving is performed.

(4) Block-based interleaving always occurs and if Condition B is met, symbol-based interleaving is additionally performed.

(5) If Condition B is met, only symbol-based interleaving is performed and if Condition B is not met, only block-based interleaving is performed.

(6) Block-based interleaving does not occur in any case. If Condition B is met, symbol-based interleaving is performed (i.e. the third embodiment).

The interleavers and the deinterleavers according to the first, second and third embodiments of the present invention have been described herein. Interleavers and deinterleavers according to the other embodiments, that is, (3), (4) and (5) can be configured by making modifications to the interleavers and the deinterleavers according to the first, second and third embodiments. Thus, the interleavers and deinterleavers according to the other embodiments will not be described in detail herein.

It is also made clear that the present invention is not limited to an OFDM communication system since OFDM symbols are a mere example of modulation symbols. Therefore, the present invention is applicable to any communication system using a modulation scheme as far as Condition A or Condition B is met. That is, the present invention can also be implemented for communication systems using other modulation schemes than OFDM.

As is apparent from the above description, the present invention advantageously prevents concentration of errors in a particular code block and increases the use efficiency of channel resources, through channel interleaving. Consequently, overall data reception performance can be increased.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. An interleaving method in a wireless communication system, comprising:
    determining whether coded bits to be transmitted in one modulation symbol are selected from a plurality of code blocks; and
    interleaving, by an interleaver, the coded bits on a modulation symbol basis, if the coded bits to be transmitted in the modulation symbol are selected from a plurality of code blocks.

2. The interleaving method of claim 1, further comprising interleaving the coded bits on a code block basis, before the determination.

3. The interleaving method of claim 1, further comprising interleaving the coded bits on a code block basis, if the coded bits to be transmitted in the modulation symbol are not selected from a plurality of code blocks.

4. The interleaving method of claim 1, wherein the modulation symbol is an Orthogonal Frequency Division Multiplexing (OFDM) symbol.

5. An interleaving method in a wireless communication system, comprising:
    determining whether the number of code blocks to be transmitted in one Transmission Time Interval (TTI) is larger than the number of modulation symbols available in the TTI; and
    interleaving, by an interleaver, coded bits selected from at least one of the code blocks and transmitted in one modulation symbol on a modulation symbol basis, if the number of the code blocks to be transmitted in the TTI is larger than the number of the modulation symbols available in the TTI.

6. The interleaving method of claim 5, wherein the modulation symbol is an Orthogonal Frequency Division Multiplexing (OFDM) symbol.

7. A deinterleaving method in a wireless communication system, comprising:
    determining whether coded bits transmitted in one modulation symbol are from a plurality of code blocks; and
    deinterleaving, by a deinterleaver, the coded bits on a modulation symbol basis, if the coded bits transmitted in the modulation symbol are from a plurality of code blocks.

8. The deinterleaving method of claim 7, further comprising deinterleaving the modulation symbol-based deinterleaved bits on a code block basis.

9. The deinterleaving method of claim 7, further comprising deinterleaving the coded bits on a code block basis, if the coded bits transmitted in the modulation symbol are not selected from a plurality of code blocks.

10. The deinterleaving method of claim 7, wherein the modulation symbol is an Orthogonal Frequency Division Multiplexing (OFDM) symbol.

11. A deinterleaving method in a wireless communication system, comprising:
    determining whether the number of code blocks transmitted in one Transmission Time Interval (TTI) is larger than the number of modulation symbols available in the TTI; and
    deinterleaving, by a deinterleaver, coded bits of a modulation symbol on a modulation symbol basis, if the number of the code blocks transmitted in the TTI is larger than the number of the modulation symbols available in the TTI.

12. The deinterleaving method of claim 11, wherein the modulation symbol is an Orthogonal Frequency Division Multiplexing (OFDM) symbol.

13. An interleaving apparatus in a wireless communication system, comprising:
- a controller for controlling the coded bits to be provided to a symbol-based interleaver, if coded bits to be transmitted in one modulation symbol are selected from a plurality of code blocks; and
- the symbol-based interleaver for interleaving the coded bits on a modulation symbol basis.

14. The interleaving apparatus of claim 13, further comprising a block-based interleaver for interleaving the coded bits on a code block basis before the coded bits are provided to the symbol-based interleaver.

15. The interleaving apparatus of claim 13, further comprising a block-based interleaver for interleaving the coded bits on a code block basis, if the coded bits to be transmitted in the modulation symbol are not selected from a plurality of code blocks, wherein the controller controls the coded bits to be provided to the block-based interleaver.

16. The interleaving apparatus of claim 13, wherein the modulation symbol is an Orthogonal Frequency Division Multiplexing (OFDM) symbol.

17. An interleaving apparatus in a wireless communication system, comprising:
- a controller for controlling coded bits selected from at least one of the code blocks and transmitted in one modulation symbol to be provided to a symbol-based interleaver, if the number of code blocks to be transmitted in one Transmission Time Interval (TTI) is larger than the number of modulation symbols available in the TTI; and
- the symbol-based interleaver for interleaving the coded bits on a modulation symbol basis.

18. The interleaving apparatus of claim 17, wherein the modulation symbol is an Orthogonal Frequency Division Multiplexing (OFDM) symbol.

19. A deinterleaving apparatus in a wireless communication system, comprising:
- a controller for controlling the coded bits to be provided to a symbol-based deinterleaver, if coded bits transmitted in one modulation symbol are from a plurality of code blocks; and
- the symbol-based deinterleaver for deinterleaving the coded bits on a modulation symbol basis.

20. The deinterleaving apparatus of claim 19, further comprising a block-based deinterleaver for deinterleaving the modulation symbol-based deinterleaved bits on a code block basis.

21. The deinterleaving apparatus of claim 19, further comprising a block-based deinterleaver for deinterleaving the coded bits on a code block basis, if the coded bits transmitted in the modulation symbol are not selected from a plurality of code blocks.

22. The deinterleaving apparatus of claim 19, wherein the modulation symbol is an Orthogonal Frequency Division Multiplexing (OFDM) symbol.

23. A deinterleaving apparatus in a wireless communication system, comprising:
- a controller for controlling coded bits of a modulation symbol to be provided to a symbol-based deinterleaver, if the number of code blocks transmitted in one Transmission Time Interval (TTI) is larger than the number of modulation symbols available in the TTI; and
- the symbol-based deinterleaver for deinterleaving the coded bits on a modulation symbol basis.

24. The deinterleaving apparatus of claim 23, wherein the modulation symbol is an Orthogonal Frequency Division Multiplexing (OFDM) symbol.

* * * * *